(12) United States Patent
Cha

(10) Patent No.: US 8,760,581 B2
(45) Date of Patent: Jun. 24, 2014

(54) SIGNAL PROCESSING APPARATUS AND CONTROL METHOD THEREOF

(75) Inventor: Tae-hwan Cha, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1164 days.

(21) Appl. No.: 12/023,272

(22) Filed: Jan. 31, 2008

(65) Prior Publication Data

US 2009/0059077 A1 Mar. 5, 2009

(30) Foreign Application Priority Data

Aug. 27, 2007 (KR) .................. 10-2007-0086204

(51) Int. Cl.
*H04N 5/21* (2006.01)
*H04N 5/213* (2006.01)
*H04N 1/409* (2006.01)

(52) U.S. Cl.
USPC .......................................... 348/623; 348/627

(58) Field of Classification Search
CPC ......... H04N 5/21; H04N 5/213; H04N 1/409; H04N 1/4092
USPC .......................................................... 348/623
See application file for complete search history.

(56) References Cited

U.S. PATENT DOCUMENTS

| | | | | |
|---|---|---|---|---|
| 4,538,236 | A * | 8/1985 | Dischert et al. ............... | 702/194 |
| 4,962,426 | A * | 10/1990 | Naoi et al. ..................... | 348/623 |
| 5,606,375 | A * | 2/1997 | Lee ................................ | 348/606 |
| 6,148,116 | A | 11/2000 | Park et al. | |
| 6,489,938 | B1 * | 12/2002 | Ito .................................... | 345/63 |
| 2002/0080281 | A1 * | 6/2002 | Yoshiyama et al. .......... | 348/623 |
| 2003/0151681 | A1 * | 8/2003 | Miyahara ....................... | 348/234 |
| 2004/0189874 | A1 * | 9/2004 | Wang et al. .................... | 348/627 |
| 2005/0052547 | A1 * | 3/2005 | Minakuti et al. ........... | 348/224.1 |
| 2007/0177059 | A1 * | 8/2007 | Jo .................................. | 348/623 |

FOREIGN PATENT DOCUMENTS

| | | |
|---|---|---|
| EP | 0714210 A2 | 5/1996 |
| EP | 0963112 A1 | 12/1999 |
| JP | 11-004363 A | 1/1999 |
| KR | 10-0230391 B1 | 11/1999 |

OTHER PUBLICATIONS

English machine translation of JP 11004363.*
Human Translation of JP 11004363; "Contour Correction Circuit"; Hirobumi, Ishii; 15 Pages; Translated by: Phoenix Translations.*
Communication from the European Patent Office dated May 20, 2010, in counterpart European Application No. 08153588.2.

(Continued)

*Primary Examiner* — Benjamin R Bruckart
*Assistant Examiner* — Carmine Malangone
(74) *Attorney, Agent, or Firm* — Sughrue Mion, PLLC

(57) ABSTRACT

There are provided a signal processing apparatus and a control method thereof. The signal processing apparatus includes: a noise detecting unit which detects a signal-to-noise ratio of an input video signal; a coring unit which performs coring to remove a component of the video signal having a level within a predetermined reference range; and a control unit which adjusts the reference range of the coring unit corresponding to the detected signal-to-noise ratio and controls the coring unit to core the video signal based on the adjusted reference range.

5 Claims, 5 Drawing Sheets

(56) References Cited

OTHER PUBLICATIONS

Powell, P. G., Bayer, B. E., "A Method for the Digital Enhancement of Unsharp, Grainy Photographic Images" International Conference on Electronic Image Processing, Jul. 6, 1982, p. 179-183, XP001051936.

Communication dated Jul. 4, 2013 issued by the Korean Intellectual Property Office in counterpart Korean Patent Application No. 10-2007-0086204.

* cited by examiner

SIGNAL PROCESSING APPARATUS AND CONTROL METHOD THEREOF

CROSS-REFERENCE TO RELATED APPLICATION

This application claims priority from Korean Patent Application No. 10-2007-0086204, filed on Aug. 27, 2007 in the Korean Intellectual Property Office, the disclosure of which is incorporated herein by reference.

BACKGROUND OF INVENTION

1. Field of Invention

Apparatuses and methods consistent with the present invention relate to signal processing, and more particularly, to signal processing and coring to reduce noise included in a video signal.

2. Description of Related Art

In general, a signal processing apparatus such as a television, a set top box or the like includes a decoder, a scaler, an Integrated Circuit (IC) for image quality improvement, etc. The signal processing apparatus processes and outputs a video signal received from an external device such as a computer, a digital versatile disc (DVD) or the like or a broadcasting signal received from a broadcasting station.

The signal may include noise while being transmitted or received, which may cause an error in the signal processing. Particularly, in the case of a video signal having a high frequency, the noise becomes distinguished in an image thereof.

In a related art signal processing apparatus, a coring method has been typically employed to reduce noise.

FIG. 1 illustrates such a related art signal processing apparatus. As shown, the signal processing apparatus includes a high pass filter (HPF) 11, a first mixer 12, a coring unit 13, and a second mixer 14.

Only a high frequency component of an input video signal passes through the HPF 11, and then, is cored by the coring unit 13 for noise removal. The high frequency component which passes through the HPF 11 is removed from the video signal by the first mixer 12. The high frequency component cored through the coring unit 13 and a low frequency component output from the first mixer 12 are mixed with each other by the second mixer 14 into a video signal with reduced noise.

As shown in FIG. 2, the coring unit 13 changes a component of the high frequency signal passed through the HPF 11, having a level within a predetermined reference range –a to a, to zero, thereby removing it from the output. Generally, a signal component having a low level which causes noise is removed during this process. The reference range is pre-set in a manufacturing process of the signal processing apparatus.

In the case of a weak electric field signal which is weak in transmission of the signal and has a low signal-to-noise ratio, noise is relatively distinguished in an image thereof compared with a signal having a high signal-to-noise ratio, even with the same noise included. Thus, in order to reduce noise in the weak electric field signal, the reference range of the coring unit must be extended.

In the related art signal processing apparatus, the reference range of the coring unit which has been pre-set in the manufacturing process of the signal processing apparatus is fixed and cannot be changed later. Thus, if the reference range is extended, details of an image become deteriorated in the case of a high signal-to-noise ratio of an input video signal.

SUMMARY OF INVENTION

Accordingly, it is an aspect of the present invention to provide a signal processing apparatus which can adjust a reference range for coring depending on the state of transmission of an input video signal to reduce noise in a weak electric state and improve details of an image in a strong electric state, and a control method thereof.

Additional aspects of the present invention will be set forth in part in the description which follows and, in part, will be obvious from the description, or may be learned by practice of the present invention.

According to an aspect of the present invention, there is provided a signal processing apparatus including: a noise detecting unit which detects a signal-to-noise ratio of an input video signal; a coring unit which performs coring to remove a component of the video signal having a level within a predetermined reference range; and a control unit which adjusts the reference range of the coring unit corresponding to the detected signal-to-noise ratio and controls the coring unit to core the video signal based on the adjusted reference range.

The control unit may adjust the reference range based on a change in the signal-to-noise ratio.

The signal processing apparatus may further include a storing unit in which the reference range per each signal-to-noise ratio is stored, and the control unit may recognize the reference range corresponding to the detected signal-to-noise ratio from the storing unit to adjust the reference range of the coring unit.

According to an aspect of the present invention, there is provided a control method of a signal processing apparatus comprising a coring unit which performs coring to remove a component of an input video signal having a level within a predetermined reference range. The method includes: detecting a signal-to-noise ratio of the video signal; adjusting the reference range of the coring unit corresponding to the detected signal-to-noise ratio; and coring the video signal based on the adjusted reference range.

The reference range may be adjusted based on a change in the signal-to-noise ratio.

The method may further include storing the reference range per each signal-to-noise ratio, and the adjusting the reference range may include: recognizing the stored reference range corresponding to the detected signal-to-noise ratio; and adjusting the reference range of the coring unit based on the recognized reference range.

The control unit may adjust the reference range to be narrower if the change in the signal-to-noise ratio is an increase.

The control unit may adjust the reference range to be wider if the change in the signal-to-noise ratio is a decrease.

The adjusting the reference range may comprise adjusting the reference range to be narrower if the change in the signal-to-noise ratio is an increase.

The adjusting the reference range may comprise adjusting the reference range to be wider if the change in the signal-to-noise ratio is a decrease.

BRIEF DESCRIPTION OF DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS

Figure 1:
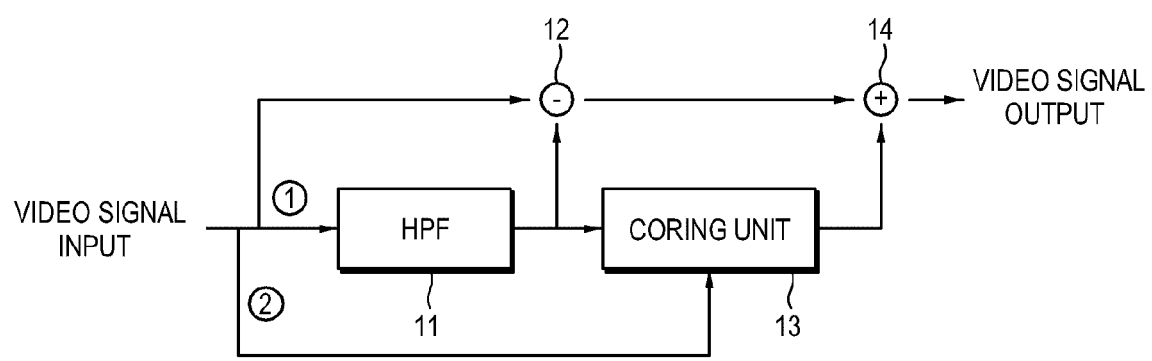
FIG. 1 illustrates a related art signal processing apparatus.
Figure 2:
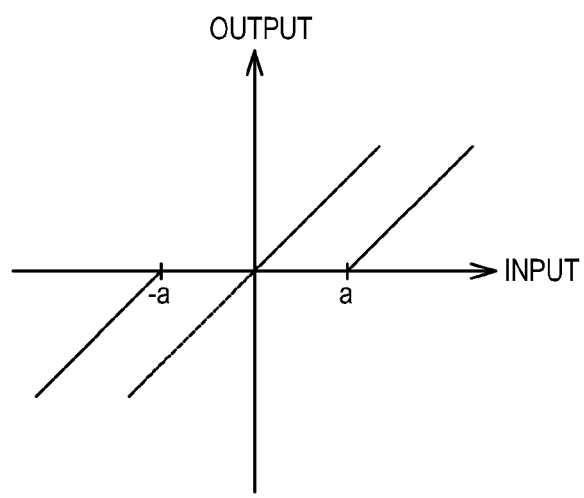
FIG. 2 illustrates a reference range for coring in the related art signal processing apparatus.

Reference will now be made in detail to the exemplary embodiments of the present invention, examples of which are illustrated in the accompanying drawings, wherein like reference numerals refer to like elements throughout. The exemplary embodiments are described below so as to explain the present invention by referring to the figures.

Figure 3:
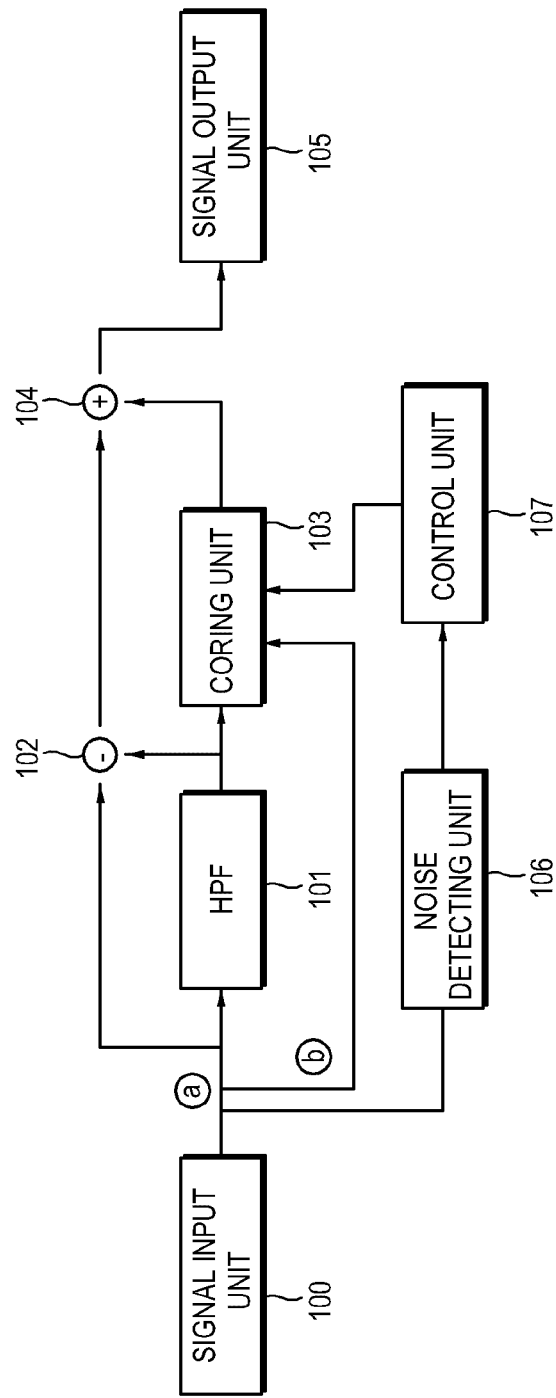
FIG. 3 illustrates a signal processing apparatus according to an exemplary embodiment of the present invention.

Referring to FIG. 3, a signal processing apparatus according to an exemplary embodiment of the present invention includes a signal input unit 100, a HPF 101, a first mixer 102, a coring unit 103, a second mixer 104, a signal output unit 105, a noise detecting unit 106 and a control unit 107.

The signal input unit 100 through which a video signal is input may include a tuner (not shown) for receiving a broadcasting signal and a connector (not shown) for receiving the video signal from an external device. The connector may be provided as a variety of connectors for receiving video signals of a variety of formats. For example, the signal input unit 100 may include a D-Sub connector, a Composite Video Broadcast Signal (CVBS) connector, an S-Video connector, a component connector, and the like.

The HPF 101 allows only a high frequency component of a video signal input through the signal input unit 100 to pass therethrough, that is, a signal component having a frequency higher than a predetermined cut-off frequency.

The first mixer 102 removes the high frequency component which passes through the HPF 101 from the video signal input through the signal input unit 100 and outputs a low frequency component.

The coring unit 103 performs coring to change a level of a signal component within a predetermined reference range into zero. Here, the reference range is pre-set to remove a component of the video signal having a low level which causes noise. The reference range may be adjusted by the control unit 107, which will be described later, and the coring is performed under the adjusted reference range.

The second mixer 104 mixes the video signal from which the high frequency component is removed through the first mixer 102 and the signal component cored through the coring unit 103, so as to output a video signal with noise reduced. The video signal output from the second mixer 104 is output through the signal output unit 105 to an internal or external display.

The noise detecting unit 106 detects a signal-to-noise ratio which refers to a ratio of noise included in the video signal. The noise detecting unit 106 may receive a signal-to-noise ratio detected by the tuner of the signal input unit 100, a signal amplifying unit (not shown) or the like.

The control unit 107 adjusts the reference range of the coring unit 103 on the basis of the signal-to-noise ratio from the noise detecting unit 106. The control unit 107 may be provided as a central processing unit (CPU), a microcomputer, or the like.

That is, the control unit 107 determines that the video signal includes a relatively large amount of noise if the signal-to-noise ratio is low and adjusts the reference range of the coring unit 103 to be wide. The control unit 107 also determines that the video signal includes a relatively low amount of noise if the signal-to-noise ratio is high and adjusts the reference range of the coring unit 103 to be narrow. Here, the adjustment of the reference range may be pre-set according to a change in the signal-to-noise ratio.

Figure 4:
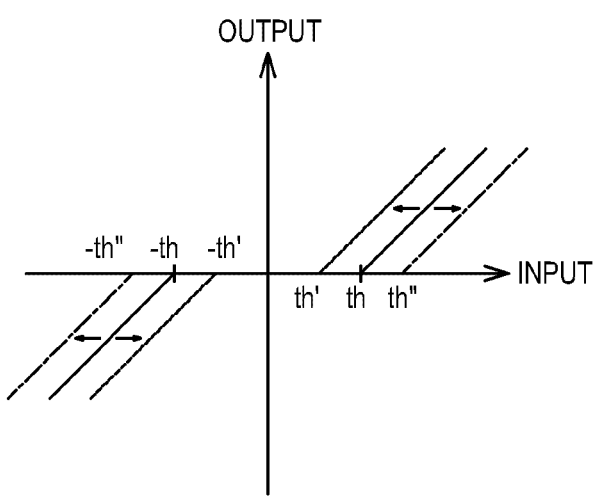
FIG. 4 illustrates a reference range for coring in the signal processing apparatus according to the exemplary embodiment of the present invention.

For example, if the signal-to-noise ratio of the video signal is changed from 55 dB into 70 dB and thus noise decreases, the control unit 107 may adjust the reference range of the coring unit 103 from a range of $\overline{t}h$ to th into a range of $\overline{t}h$ ' to th' as shown in FIG. 4.

Then, the control unit 107 controls the coring unit 103 to core the video signal based on the adjusted reference range.

The signal processing apparatus may include a storing unit (not shown) to store the reference range according to the signal-to-noise range. The storing unit may be provided inside or outside of the control unit 107.

The control unit 107 recognizes the reference range in the storing unit corresponding to the signal-to-noise range detected by the noise detecting unit 106 and adjusts the reference range of the coring unit 103 based on the recognized reference range.

For example, assuming that the reference range of $\overline{t}h$ to th is set to the signal-to-noise ratio of 55 dB; the reference range of $\overline{t}h$ ' to th' is set to the signal-to-noise ratio of 70 dB; and the reference range of $\overline{t}h$ " to th" is set to the signal-to-noise ratio of 30 dB, if the detected signal-to-noise ratio is 30 dB, the control unit 107 adjusts the reference range of the coring unit 103 into $\overline{t}h$ fh" to th" based on the stored reference range.

The video signal input through the signal input unit 100 may include a brightness signal and a chrominance signal. The brightness signal is cored with respect to the frequency thereof passing through a route a in FIG. 3, that is, through the HPF 101, the first mixer 102, the coring unit 103 and the second mixer 104. The chrominance signal is cored with respect to the color level thereof passing through a route b, that is, through the coring unit 103.

In the case of the brightness signal, a component of the high frequency signal passed through the HPF 101, having a low brightness level which causes noise, is removed by the coring unit 103. Then, the noise-removed signal is mixed with the low frequency signal output from the first mixer 102 by the second mixer 104. In the case of the chrominance signal, a signal component having a color level which causes noise is removed by the coring unit 103.

Although not shown, the signal processing apparatus may include various elements corresponding to the format of an input video signal, for example, an A/D converter which converts various formats of video signals input through the signal input unit 100 into a digital video signal having a certain format, a digital decoder, a scaler which receives a digital video signal and/or an analog video signal and adjusts a vertical frequency, resolution, a picture aspect ratio, etc. to be suitable for an output standard of the signal output unit 105, and a picture quality improving unit.

Hereinafter, a control method of the signal processing apparatus according to the exemplary embodiment of the present invention will be described referring to FIG. 5.

Figure 5:
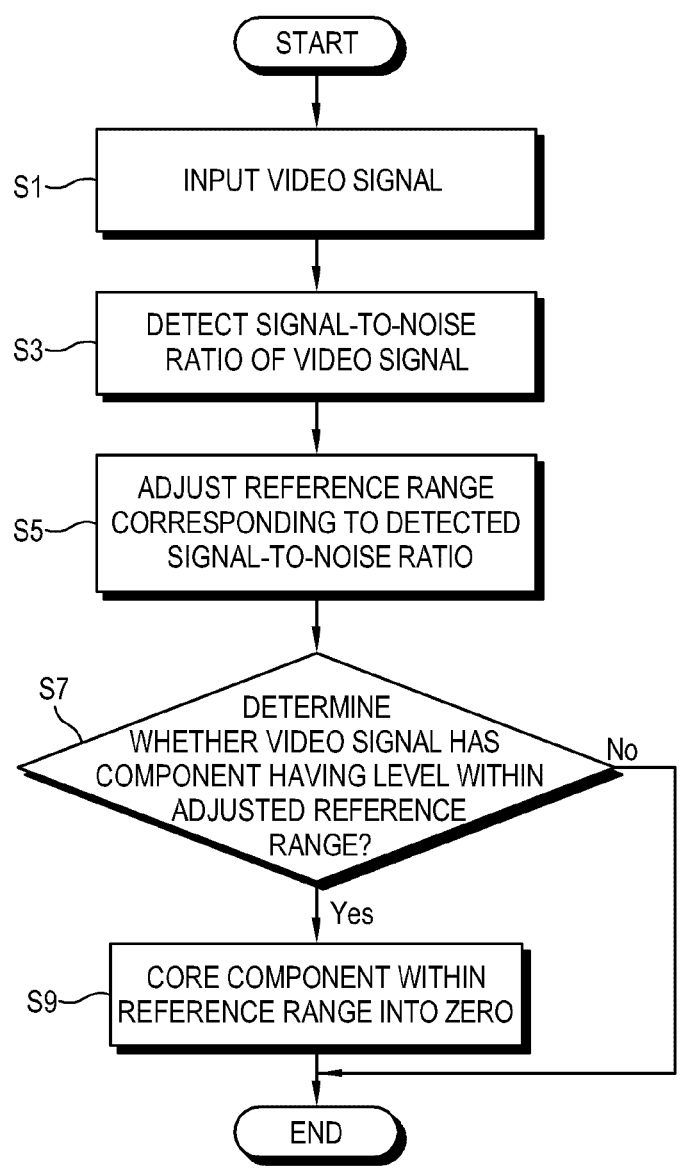
FIG. 5 is a flowchart for illustrating a control method of a signal processing apparatus according to an exemplary embodiment of the present invention.

As shown in FIG. 5, as a video signal is input (S1), the noise detecting unit 106 detects a signal-to-noise ratio of the input video signal (S3).

Then, the control unit 107 adjusts the reference range of the coring unit 103 corresponding to the detected signal-to-noise ratio (S5). As described above, the reference range of the coring unit 103 is used to remove a low level component of the input video signal which causes noise.

Then, the control unit 107 controls the coring unit 103 to perform coring based on the adjusted reference range. Specifically, it is determined whether or not the input video signal includes a component having a level within the adjusted reference range (S7). If the video signal includes the component having the level within the adjusted reference range, the coring unit 103 cores the component level of the video signal into zero (S9).

As described above, according to an exemplary embodiment of the present invention, the reference range of the coring is adjusted corresponding to the signal-to-noise ratio of the video signal, and accordingly, the coring can be adaptively performed according to the intensity of noise included in the video signal. Further, noise which is generated in a weak electric field can be reduced; and the signal and details of an image can be prevented from distortion in a strong electric field.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A signal processing apparatus comprising:
    a storage which stores a plurality of reference ranges corresponding to a plurality of signal-to-noise ratios;
    a noise detector which detects a signal-to-noise ratio of an input video signal;
    a coring device which performs coring to remove a component of the input video signal having a level within a reference range; and
    a controller which, by referring to the stored reference ranges, adjusts the reference range of the coring unit according to the detected signal-to-noise ratio and controls the coring unit to core the video signal based on the adjusted reference range;
    wherein the controller adjusts the reference range based on a change in the signal-to-noise ratio;
    wherein if the change in the signal-to-noise ratio is an increase, the controller adjusts the reference range to be narrower; and
    wherein if the change in the signal-to-noise ratio is a decrease, the controller adjusts the reference range to be wider.

2. The signal processing apparatus according to claim 1 wherein the controller recognizes the reference range, among the plurality of stored reference ranges, corresponding to the detected signal-to-noise ratio, among the plurality of signal-to-noise ratios, to adjust the reference range of the coring device.

3. The signal processing apparatus according to claim 1, wherein the component of the image signal which is removed by the coring unit is a signal component which has a color level which causes noise.

4. A control method of a signal processing apparatus comprising a coring device which performs coring to remove a component of an input video signal having a level within a reference range, the method comprising:
    storing a plurality of reference ranges corresponding to a plurality of signal-to-noise ratios;
    detecting a signal-to-noise ratio of the input video signal;
    adjusting the reference range of the coring device according to the detected signal-to-noise ratio by referring to the plurality of stored reference ranges; and
    coring the input video signal based on the adjusted reference range;
    wherein the reference range is adjusted based on a change in the signal-to-noise ratio;
    wherein if the change in the signal-to-noise ratio is an increase, the controller adjusts the reference range to be narrower; and
    wherein if the change in the signal-to-noise ratio is a decrease, the controller adjusts the reference range to be wider.

5. The method according to claim 4, wherein the adjusting the reference range comprises:
    recognizing the reference range, among the plurality of stored reference ranges, corresponding to the detected signal-to-noise ratio, among the plurality of signal-to-noise ratios; and
    adjusting the reference range of the coring unit based on the recognized reference range.

* * * * *